Aug. 7, 1951  R. M. SNIVELY  2,563,286
GRINDER
Filed Nov. 14, 1947  2 Sheets-Sheet 1
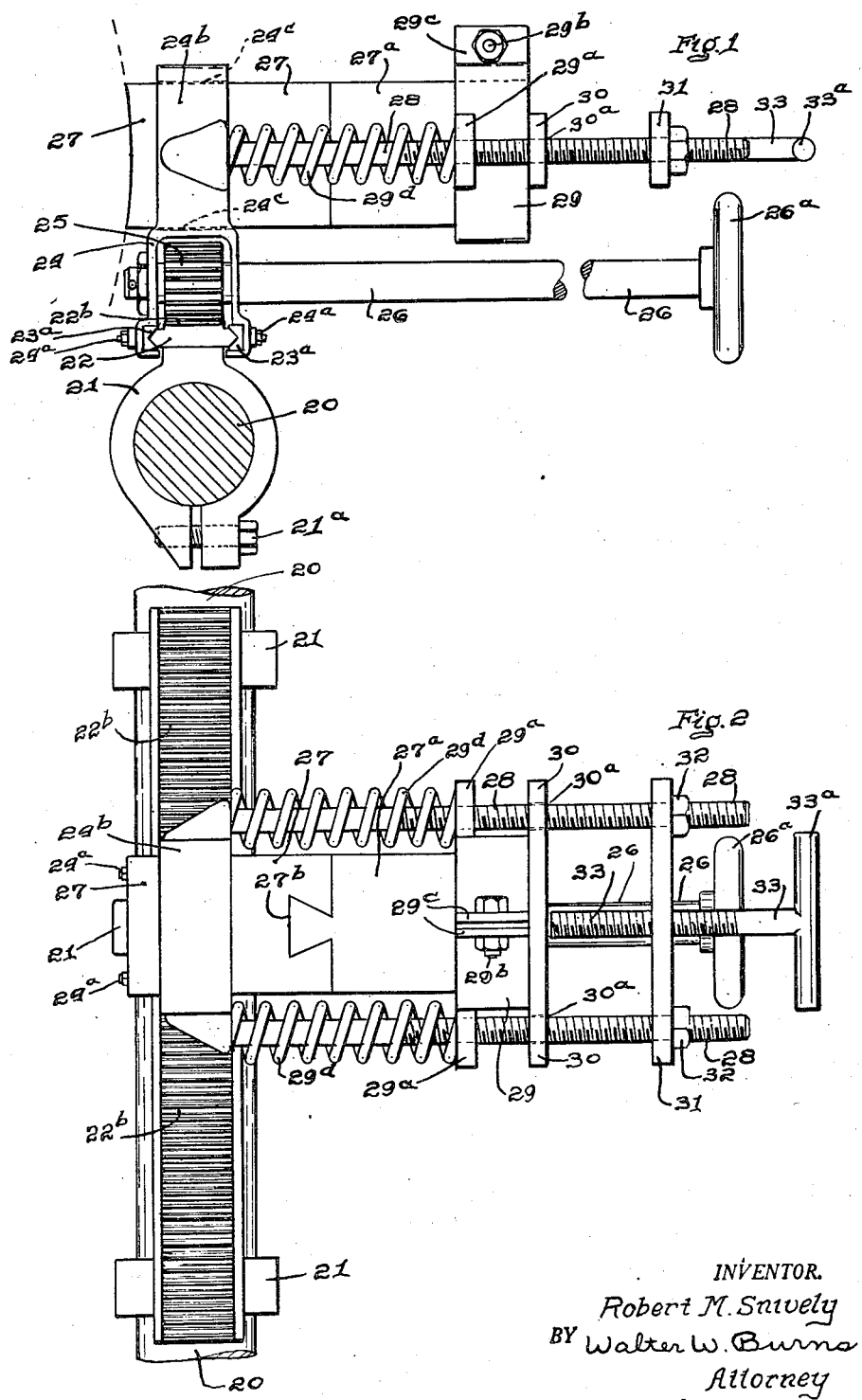
INVENTOR.
Robert M. Snively
BY Walter W. Burns
Attorney Aug. 7, 1951 R. M. SNIVELY 2,563,286
GRINDER
Filed Nov. 14, 1947 2 Sheets-Sheet 2

INVENTOR.
Robert M. Snively
BY Walter W. Burns
Attorney

Patented Aug. 7, 1951

2,563,286

UNITED STATES PATENT OFFICE 2,563,286

GRINDER

Robert M. Snively, Fairmont, W. Va.

Application November 14, 1947, Serial No. 786,105

7 Claims. (Cl. 51—244)

This invention relates to grinders and has particular relation to those grinders which are especially adapted for grinding and polishing cylindrical surfaces, such as bronze or steel rings and commutators for rotary electrical equipment.

In using grinding equipment, such as the present invention is intended for, it has in the past been difficult to use grinding equipment because of the nature of the work. There are several different methods in present use which produce more or less satisfactory results but if satisfactory results are obtained the time involved is much greater than with the instant invention.

One of these methods is to rub the commutator with a hand stone and run the commutator at full speed. This, however, obviously cannot produce a surface which is both smooth and not out of round.

Another method is to install a tool head from a lathe with a cutting tool and have a motor to drive the rotor of the commutator. The motor is usually necessary because the full speed would be too great for the safe operation of the tool. With this method it is usually necessary to finish with a hand stone.

Another method is to use a lathe tool head and a stone in place of the cutting tool and run at full speed. To install this lathe tool head requires about three hours. In addition to this a great many of the brush holders have to be removed in order to permit of the installation of the lathe tool head.

Another method and one which produces a satisfactory job is to dismantle the rotary machine and take the rotor to a machine shop where the same is set up on a lathe and the commutator turned down until it is smooth and then polished while on the lathe. The cost, however, with this method is very much greater than desired for the reason that in addition to the time required, a crane usually has to be employed to remove the rotor from the machine and the rotor has to be removed from the machine shop and set up on the lathe.

The primary object of the instant invention is the provision of an improved grinder for the grinding of cylindrical surfaces.

Another object of the invention is the provision of an improved grinder which can be installed on a machine where the grinding is to take place and which will produce an accurate cylindrical surface and have positive feed devices to move the grinding element both along a cylindrical surface parallel to its axis and also toward and from the cylindrical surface being refinished to produce the desired succession in cuts or grinding courses across the surface.

Another and further object of the invention is the production of a grinder for cylindrical surfaces which will maintain the grinder in position so that the grinding element will always be steady and in its exact desired position.

Still another object of the invention is the provision of a grinder wherein supports are provided which render the grinder easily attached to and detached from a large rotary electrical machine without dismantling the machine except for the removal of one brush and its holder from the brush holder support.

Another and still further object of the invention is to provide an improved grinder for commutators or rings of rotary electrical equipment which will not only cut accurately but will always be held with the grinding element steady, thus preventing chattering and causing irregularities on the surface being treated.

Another and still further object of the invention is the provision of such a grinder which will have its grinding element resiliently mounted and held against the positively operated feeding mechanism in order that there will be a direct pressure which is positive for pressing the stone or other grinding element against the work.

Another and still further object of the invention is the provision of such an improved grinder which will have its support so constructed that when attached to the rotary machine upon which the commutator or ring or other cylindrical surface is to be refinished, the mere act of mounting will place the machine with its sliding guide for its carriage in such a position that when fed across the surface to be treated, a cylindrical surface will always be obtained.

Other and further objects of the invention will be apparent to one skilled in the art from a reading of the complete specifications.

Referring to the drawings wherein is illustrated an embodiment of the invention, Fig. 1 is a side elevation of the invention.

Fig. 2 is a top plan view.

Similar reference characters refer to the same or similar parts throughout the specification and drawing.

Figure 3:
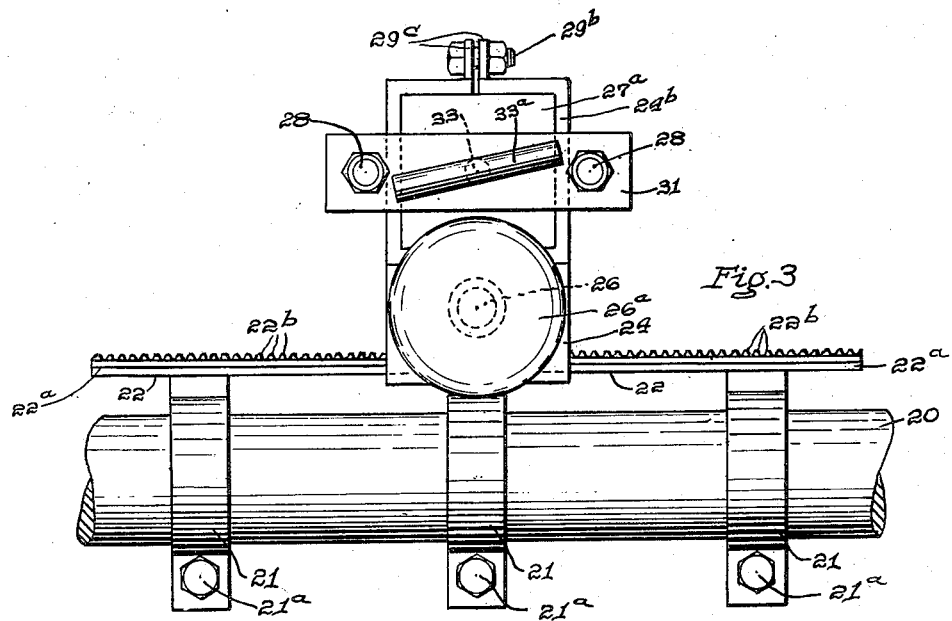
Fig. 3 is a rear view.

The numeral 20 designates the brush-holder supporting rod to which the grinder is attached when in operation on a machine, the commutator or rings of which are desired to be refinished. The supporting elements for the grinder are designated by the reference character 21 which is in the form of one or more clamps which surround the brush holder supporting rod 20 and are provided with tightening screws 21a. In case the brush holder supporting rod 20 is smaller than the clamp 21 suitable sets of split bushings may be used to take up the space between the brush holder supporting rod 20 and the clamp or clamps 21, as will be later described. Secured to the tops of the clamps 21 is a rack 22 which has at its edges guides 22a. The rack 22 is provided with a set of teeth 22b which set of teeth extends substantially throughout the length of the rack and is used for moving a grinder carriage as a whole as will later be made clear.

In contact with the guides 22a on the rack 22 are slides 23a which are mounted in the sliding carriage or head 24. Suitable slide adjusting screws 24a are provided to bring the slides 23a in close cooperation with the guides 22a of the rack 22.

The carriage or sliding head 24 is provided with an opening in which is rotatively mounted a gear 25. Supporting the gear 25 is a shaft 26 which shaft 26 is keyed to the gear 25 and has journal bearings in the sliding head or carriage 24. A hand wheel 26a is provided at the outer end of the shaft 26 in order to turn the shaft 26 and the gear 25 to move the sliding head or carriage 24 along the rack 22. Integral with the sliding head or carriage 24 is a rectangular frame 24b, having an opening 24c. This opening 24c is constructed slightly larger than the grinding element 27, which slides in the opening 24c without difficulty.

Rigidly secured to the frame 24b at their ends are two rods 28 which extend rearwardly and upon which a sliding frame 29 is mounted by means of the ears 29a. The openings in the ears 29a of the sliding frame 29 are made so that the ears 29a may slide on the rods 28 without difficulty. At the upper side of the frame 29, I provide a clamp 29c which may be tightened by the bolt and nut 29b to clamp the frame 29 to the carrying member 27a.

Surrounding the rods 28 and having their ends respectively against the frame 24b and the ears 29a are spring members 29d which when the clamping member 29c is tightened, normally tend to hold the sliding frame 29 to the rear and away from the rectangular frame 24b. The sliding frame 29 is provided with an opening of the same size as the opening already described as being in the rectangular frame 24b for the purpose of receiving the grinding element 27. This grinding element 27 may be made of grinding material for its full length or the forward portion may be the grinding element and the rearward portion as at 27a, may be of wood, plastic or other non-grinding material secured to the grinding element 27 itself as at 27b. At the rear of the sliding frame 29 and surrounding the rods 28 is a pressure plate or follower-bar 30. This follower bar 30 is provided with holes 30a which surround the rods 28 and provide for the movement of the plate 30 along the rods 28.

Adjustably secured to the rods 28 is a plate 31 which is held in position by suitable lock nuts 32 against rearward movement along the rods 28. Threaded in an opening at the center of the plate 31 and mid-distance between the rods 28 is a threaded adjusting rod 33, which has at its outer end a T-shaped member 33a which serves as a handle to turn the rods 33 in its thread to adjust the same relative to the plate 31. The forward end of the rod 33 terminates in a point which impinges against a plate 30 in order to press against the grinding element 27 and the sliding frame 29 to push the grinding element toward the surface upon which it is acting.

I will now describe the operation of the invention.

It will be understood that the brush-holder supporting rod 20 which carries the brushes is that part of the generator or motor which carries the grinder when in position to grind. Before attaching the grinder to the generator or motor the brush holder should be removed from its supporting rod 20 and the clamp or clamps 21 of the grinder placed in a position to be supported by the brush holder supporting rod 20. Before permanently securing the clamp or clamps 21 to the brush holder supporting rod 20, the grinding element 27 should be withdrawn to a position where its forward surface is in close proximity to the forward face of the frame 24b. This is accomplished by turning the handle 33a in a counter-clockwise direction. This action removes the forward end of the screw 33 from holding the plate 30 in a forward position and permits the springs 29d which surround the rods 28 to move the sliding frame 29 to a more rearward position and carry with it the grinding element and the plate 30. It might be here noted that the sliding frame 29 which fits around the grinding element or its carrying member 27a, being held by the clamping means 29b, forces the sliding frame 29 to its rearward position against the plate 31, regardless of the adjustment of the screw 33.

By now turning the hand wheel 26a in a counterclockwise direction the gear 25 moving along the rack 22 will force the sliding carriage or head 24 to one end of the rack 22, or in a position where the grinding element 27 is adjacent one end of the surface to be worked.

The clamp or clamps 21 may now be clamped to the brush holder supporting rod 20 and the grinder is in readiness for operation. By now turning the handle 33a and bringing the grinding element into contact with the commutator or ring and by turning the hand wheel 26a clockwise the grinding element 27, being carried by the sliding carriage 24, is moved along the surface of the commutator or ring while the commutator or ring with the armature or rotor is being rotated. This brings about contact between the surface of the commutator or ring and the grinding element 27 which takes off a cut from the surface of the commutator or ring in a well known manner. After the grinding element 27 is moved to the end of the commutator or ring, the hand wheel 26a is reversed in its operation, being now operated counter-clockwise and the grinding element 27 is brought back to the first position where it is ready for another cut. By now turning the handle 33a clockwise, it will be seen that the plate 30 will force the sliding frame 29 with the grinding element 27 forward against the commutator or ring to provide for a slightly deeper cut.

As the rotor operates with the ring or commutator, the hand wheel 26a is again moved in a clockwise direction as viewed from the rear, which will of course move the grinding element over the surface of the commutator or ring.

The successive cuts across the surface of the commutator may be carried on until a clean smooth surface is produced, at which time the operation of the grinder will be complete.

It is to be noted that with the grinder head or sliding carriage 24 travelling in a straight line parallel to the axis of the commutator or ring, it cannot help but produce a surface which is cylindrical. Of course the finer the cut at the end of the operation the smoother will be the surface of the commutator or ring being trued.

At this point particular emphasis is placed upon the construction wherein the rear or outer end of the grinding element 27, which is clamped and supported in the sliding frame 29, is always held steady since it is supported in the frame 24b and the sliding frame 29 which latter is slidably supported on the rods 28 which are rigid with the frame 24b while the springs 29d take up any vibration. This construction prevents chattering and causes a very smooth operation of the grinding element when it is performing its grinding function. As the grinding element 27 is worn off it is obvious that the plate 31 with its locking nuts 32, may be moved along the rods 28 and placed in a position where the relatively short threaded screw 33 may properly operate to give the necessary movement to the grinding element 27.

Figures 4, 5, 6, 7:
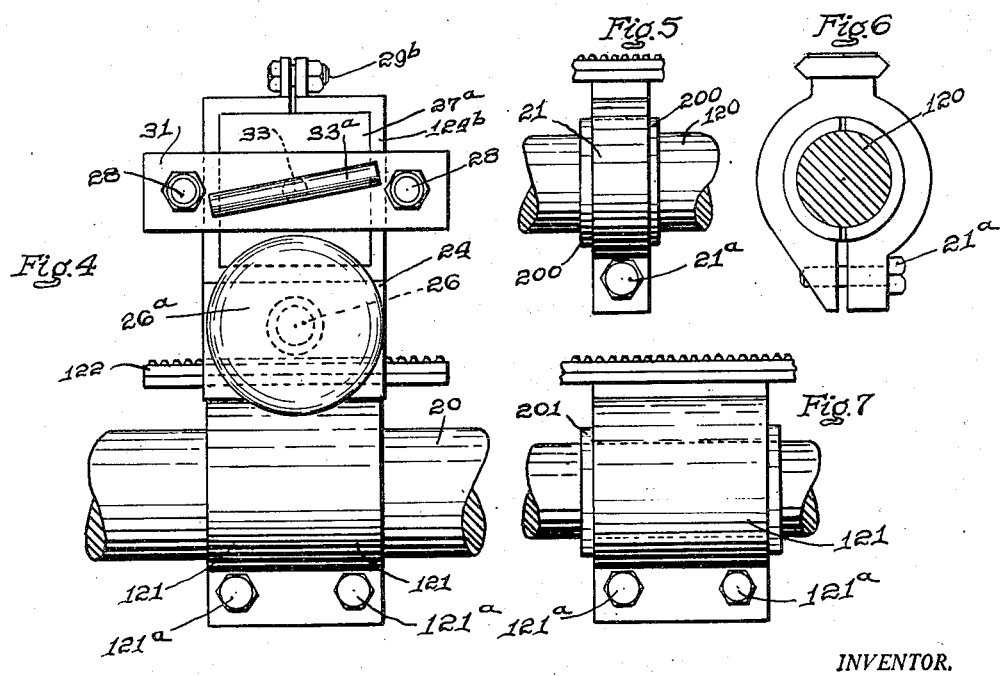
Fig. 4 is a view similar to the Fig. 3 but having a modified support for short-distance travel.
Fig. 5 is side elevation of the support using adapters for a small size brush holder on the modification of Fig. 1.
Fig. 6 is a side view of the structure of Fig. 5.
Fig. 7 is a view of the structure of Fig. 4, using adapters.

In Fig. 4 is illustrated a slightly modified support for use where there is limited space and where the necessary movement of the carriage is short. In this construction, the same carriage 24 and its parts may be used, the supporting clamp 121 being of a greater width then the clamp 21 already described. The bolts 121a are provided for tightening the clamp of the support 121 on the brush holder support 20, as in this form the necessary travel is not great, the rack 122 is shorter than the corresponding part 22 previously described.

In Figs. 5, 6, and 7 are illustrated the split bushings already referred to. These split bushings 200, 201 are made with an inside diameter to fit the brush holder support 120 which may be of a smaller diameter than the brush holder support 20.

After insertion of the split bushing 200, the tightening bolts 21a or 121a, as the case may be, are tightened.

It will be noted that Fig. 5 illustrates a support clamp 21 as shown in Figs. 1 and 3. While in Fig. 7 is shown the clamp 121, as illustrated in Fig. 4, the side view of Figs. 5 and 7 with the bushing 200 or 201 would be the same, such a view is Fig. 6.

While embodiments of the invention have been shown and described in detail, it is to be understood that the disclosure is merely illustrative and that modifications and changes may be made without departing from the spirit of the invention and within its scope as claimed.

Having described the invention, what is claimed is:

1. A grinder for commutators or rings of motors, dynamos and the like, comprising a non-rotating grinding element, guide means adjacent the surface to be ground and having grinding-element bearing surfaces for slidably holding the grinding end of the grinding element in position adjacent the surface to be ground, means for positively holding the grinding element against the surface to be ground and means for moving the grinding element and its guide means along the surface to be ground and parallel to its axis.

2. A grinder for commutators or rings of motors, dynamos and the like, comprising a non-rotating grinding element, guide means adjacent the surface to be ground and having grinding-element bearing surfaces for slidably holding the grinding end of the grinding element in position adjacent the surface to be ground, means for positively holding the grinding element against the surface to be ground, a second guide means coacting with the first named guide means for the outer end of the grinding element to guide the grinding element against the surface to be ground and means for moving the grinding element along the surface to be ground and parallel to its axis.

3. A grinder for commutators or rings of motors, dynamos and the like, comprising a non-rotating grinding element, guide means adjacent the surface to be ground and having grinding-element bearing surfaces for slidably holding the grinding end of the grinding element in position adjacent the surface to be ground, means for mechanically and positively holding the grinding element against the surface to be ground, a sliding adjustable element movable in the direction of movement of the grinding element and adjustably secured thereto and means for controlling the movement of the sliding element in the line of movement of the grinding element.

4. A grinder for commutators or rings of motors, dynamos and the like, comprising a non-rotating grinding element, guide means adjacent the surface to be ground and having grinding-element bearing surfaces for slidably holding the grinding end of the grinding element in position adjacent the surface to be ground, means for mechanically and positively holding the grinding element against the surface to be ground, including a sliding adjustable element movable in the direction of movement of the grinding element and a resilient means tending to oppose the action of the positive holding means.

5. A grinder for commutators or rings of motors, dynamos and the like, comprising a non-rotating grinding element, guide means adjacent the surface to be ground and having grinding-element bearing surfaces for slidably holding the grinding end of the grinding element in position adjacent the surface to be ground, resilient means tending to force the grinding element away from the surface to be ground and a screw means for overcoming the resilient means and positively forcing the grinding element against the surface to be ground.

6. A grinder for commutators or rings of motors, dynamos and the like, comprising a non-rotating grinding element, guide means adjacent the surface to be ground and having grinding-element bearing surfaces for slidably holding the grinding end of the grinding element in position adjacent the surface to be ground, means for mechanically and positively holding the grinding element against the surface to be ground, including a sliding element having a clamping means about the grinding element and adjustable in the direction of movement of the grinding element, and a resilient means tending to oppose the action of the positive holding means.

7. A grinder for commutators or rings of motors, dynamos and the like, comprising a non-rotating grinding element, an inner guide means adjacent the surface to be ground and having grinding-element bearing surfaces for slidably holding the grinding end of the grinding element in position adjacent the surface to be ground, a pair of rearwardly extending grinding element guides, a sliding frame on the grinding element guides and secured to the grinding element, springs adjacent the rearwardly extending guides to tend to force the grinding element away from its work, a plate on the rearwardly extending guides and at the rear of the grinding element, and positively operating screw means operative on the plate to force the grinding element toward the surface to be ground.

ROBERT M. SNIVELY.

REFERENCES CITED

The following references are of record in the file of this patent:

UNITED STATES PATENTS

| Number | Name | Date |
|---|---|---|
| 443,270 | Cummings | Dec. 23, 1890 |
| 603,061 | Jordan | Apr. 26, 1898 |
| 632,666 | Wilkie | Sept. 5, 1899 |
| 654,734 | Jahn | July 31, 1900 |
| 789,917 | Jordan | May 16, 1905 |
| 969,633 | Jordan | Sept. 6, 1910 |
| 991,996 | Hunt | May 9, 1911 |
| 1,463,224 | Norrel | July 31, 1923 |
| 1,881,410 | Lintelmann | Oct. 4, 1932 |